May 21, 1940. G. HUNT 2,201,340
CLUTCH
Filed Jan. 10, 1938 2 Sheets-Sheet 1
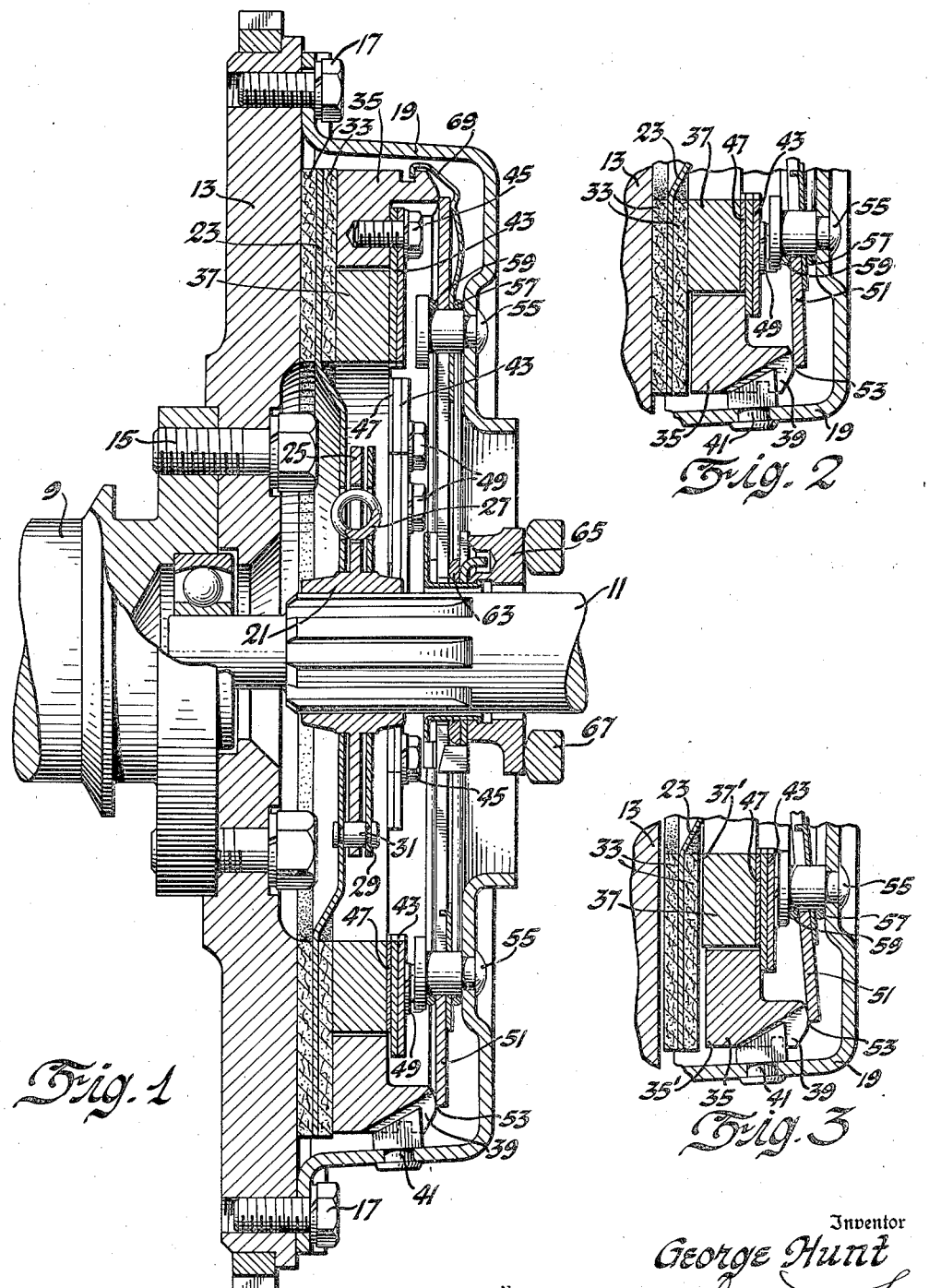
Inventor
George Hunt
By Rhetmore, Spencer & Flint
Attorneys

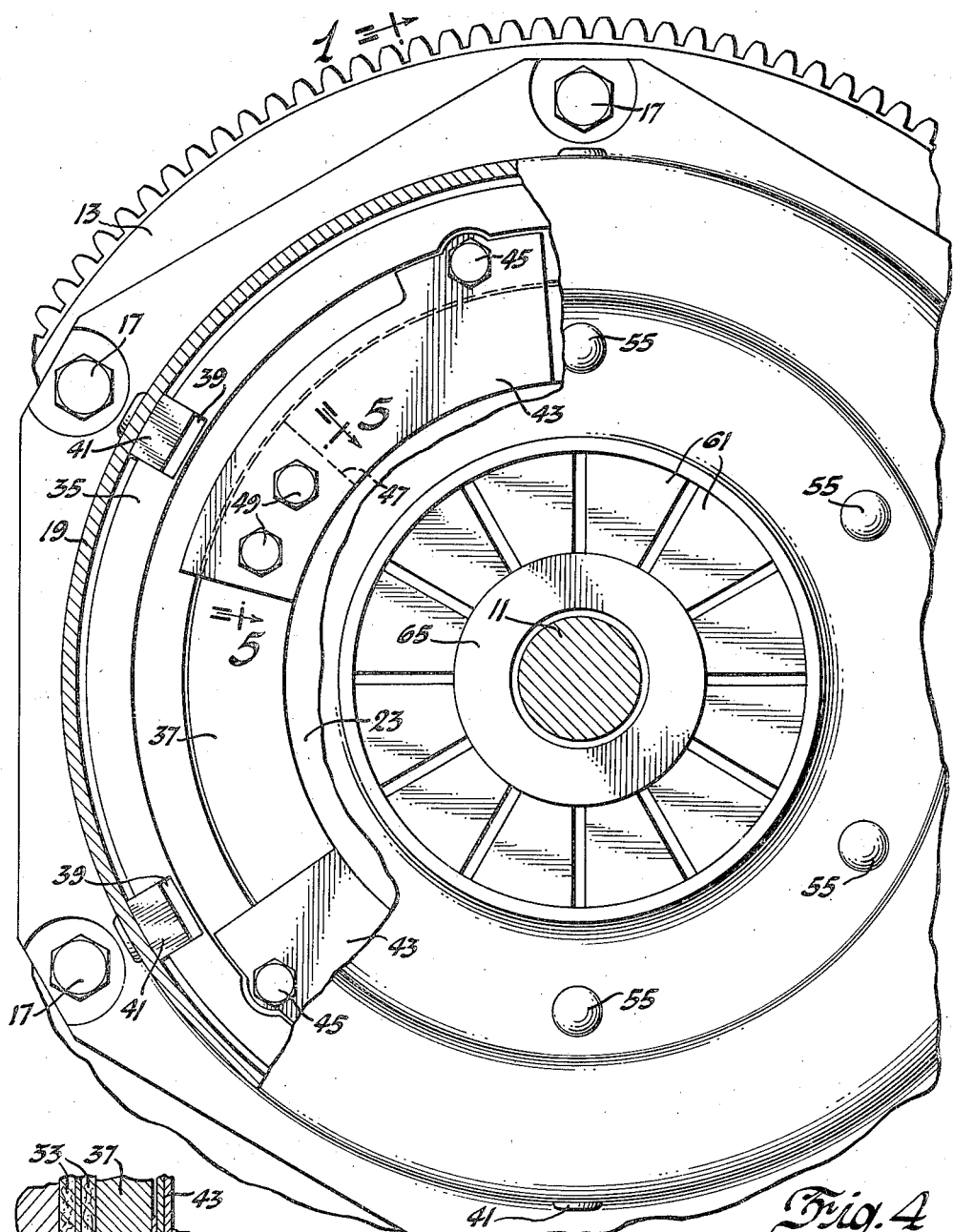

Patented May 21, 1940

2,201,340

UNITED STATES PATENT OFFICE 2,201,340

CLUTCH

George Hunt, Dayton, Ohio, assignor to General Motors Corporation, Detroit, Mich., a corporation of Delaware Application January 10, 1938, Serial No. 184,221

5 Claims. (Cl. 192—68)

This invention relates to clutches and has been designed primarily to improve the clutch which is used to couple the engine shaft and the transmission shaft of a motor vehicle.

An object of the invention is to provide such a clutch with mechanism adapted to effect a gradual engagement of the driving and driven members.

A further object is to avoid the necessity of providing yieldable tongues as parts of the driven plate, this being accomplished by resort to a two part pressure plate having yielding means between the parts thereof adapted to resist relative axial movement.

Other objects include simplicity in construction, efficiency in operation, low cost and the possibility of using an improved and simplified driven plate.

The invention is illustrated by the accompanying drawings wherein

Figure 1 is a transverse section on line 1—1 of Figure 4.

Figure 2 is a section corresponding to the lower portion of Figure 1 but showing the parts displaced from the position they occupy in Figure 1.

Figure 3 is a similar section showing another relative position of parts.

Figure 4 is a view in elevation partly broken away.

Figure 5 is a sectional detail on line 5—5 of Figure 4.

Numeral 9 is used on the drawings to designate the shaft of the engine of a motor vehicle, and 11 is the transmission shaft. The flywheel 13 is secured to the engine shaft by fastening means 15. Fastening means 17 secure a cover 19 to the flywheel. The cover houses the end of shaft 11 and the clutch mechanism as is usual. Within the housing and on shaft 11 is the hub 21 of a driven plate 23. The hub is formed with a flange 25 and between the flange and the driven plate 23 is a cushioning spring 27, there being an additional plate 29 secured to the driven plate at 31. This cushioning means constitutes no part of the invention, and the invention might be applied to a clutch in which the cushioning expedient is omitted. At its outer periphery the driven plate carries friction facings 33 adapted to engage the flywheel face and the pressure plate in the usual way.

The pressure plate is formed from two nested co-axial rings, an outer ring 35 and an inner ring 37. The outer ring has a plurality of notches 39 engaged by lugs 41 carried by the cover 19, this expedient permitting the required axial movement of the pressure plate and serving to transmit the rotary motion of the flywheel and cover to the pressure plate ring 35. An assembly of arcuate superposed spring plates 43 is secured at one end to the outer ring as shown at 45. The other end of the assembly is spaced slightly from the inner ring by a washer 47 as shown by Figure 5 and is secured to the ring by fastening means 49. It may be assumed that the spring elements 43 are flat when unstressed and that the washer 47 normally spaces the face 37' of ring 37 slightly nearer the driven plate than the face 35' of the ring 35, this being shown by Figure 3 which is intended to illustrate the completely released position of the clutch.

The engagement of the clutch is preferably effected by the now well-known Belleville spring marked on the drawings by numeral 51. This spring plate contacts at its outer circular peripheral edge with the outer ring at 53. The plurality of pivot pins 55 distributed in a circular series and carried by the cover 19 support fulcrum rings 57 and 59. The spring plate 51 has holes to receive the pivot pins 55 and is located between the rings 57 and 59. Radially inward from pins 55 the spring plate may be slotted to form resilient fingers 61. These fingers are connected in any preferred way as at 63 with a throwout collar 65. The latter is adapted to be reciprocated to effect clutch release toward the left in Figure 1 by a suitable lever, the forked ends of which appear at 67.

When the clutch is engaged the Belleville spring plate presses the ring 35 toward the driven plate and the flywheel, its reaction being taken on ring 57. When the lever 67 reciprocates the collar 65 to the left the load is taken from ring 57 and the spring plate 51 fulcrums on ring 59 and the pressure on ring 35 is released. Any convenient expedient such as 69 may be used to insure the reciprocation of ring 35 away from the driven plate.

The above clutch action is not new with this application, the novelty of the application being found in the pressure plate and its relation to the other parts. When the clutch pedal is so moved as to permit the Belleville spring to effect clutch engagement, the spring first moves the ring 35 toward the driven plate, this first step being illustrated by comparing Figure 2 with Figure 3. When the ring 35 is so moved the yieldable connection 43 between the two rings carries ring 37 along with ring 35, ring 37 coming into contact with the facing of the driven plate before outer plate 35 contacts the driven plate. The clutch spring 51 continues to move the ring 35 until it too is engaged with the driven plate, the yielding means 43 being in the meantime stressed to resist the action of the main clutch spring 51. When the full force of spring 51 is acting on the outer ring 35 both rings are firmly pressed against the driven plate, the spring 43 being in a stressed condition. The stressing of the spring 43 resists the action of the main spring 51 and affords the gradual engagement which has been found to be necessary to secure smooth clutch action. In the action of clutch release the movements of the parts of the pressure plate are reversed as will be seen by comparing Figures 1, 2 and 3, which represents the steps in the releasing movement. By the expedient described above, the clutch engagement should be smooth owing to the gradual introduction of the grip of the pressure plate upon the driven plate. The device may be used with conventional driven plates as now frequently used wherein yielding tongues are bent from the plane of the plate but it is believed that the gradual engagement obtained by the use of the structure herein disclosed may do away with the need for such spring tongues and thus make possible more rugged and efficient driven plates.

I claim:

1. In a clutch, a flywheel having a cover, a driven plate, a pressure plate housed by said cover and movable axially to engage said driven plate, spring means in abutment to said cover and operable to resiliently move said pressure plate, said pressure plate comprising nested co-axial rings and yielding means connecting said rings to resist relative axial movement.

2. In a clutch, a driving member, a driven member, a pressure plate mounted to rotate with said driving member and reciprocable to grip said driven member between itself and the driving member, spring means to reciprocate said pressure plate to active position, said pressure plate comprising first and second nested co-axial rings, yielding means connecting said rings and normally axially spacing the first ring in advance of the second ring, said spring means engaging said second ring.

3. In a clutch, a driving member, a driven member having a driven disc, a pressure plate comprising outer and inner co-axial nested rings, spring means to move said outer ring axially to engage the driven disc, yieldable means connected to said rings and positioning the inner ring axially in advance of the outer ring whereby the yieldable means opposes said spring means in reciprocating the outer ring into engagement with the driven member subsequent to the engagement of the inner ring with said driven member.

4. The invention defined by claim 3, said yieldable means comprising an arcuate spring leaf terminally secured to said outer and inner rings respectively.

5. The invention defined by claim 3, said yieldable means comprising superposed arcuate spring leaves terminally secured to said outer and inner rings respectively together with spacing means to normally space the inner ring from co-planar relation with the outer ring.

GEORGE HUNT.